(12) United States Patent
Bickerstaff et al.

(10) Patent No.: US 10,198,866 B2
(45) Date of Patent: Feb. 5, 2019

(54) HEAD-MOUNTABLE APPARATUS AND SYSTEMS

(71) Applicant: Sony Interactive Entertainment Europe Limited, London (GB)

(72) Inventors: Ian Henry Bickerstaff, London (GB); Simon Mark Benson, London (GB); Sharwin Winesh Raghoebardajal, London (GB); Darren Myatt, London (GB)

(73) Assignee: Sony Interactive Entertainment Europe Limited (GB)

( * ) Notice: Subject to any disclaimer, the term of this patent is extended or adjusted under 35 U.S.C. 154(b) by 0 days.

(21) Appl. No.: 14/897,082

(22) PCT Filed: Jun. 11, 2014

(86) PCT No.: PCT/GB2014/051797
§ 371 (c)(1),
(2) Date: Dec. 9, 2015

(87) PCT Pub. No.: WO2014/199154
PCT Pub. Date: Dec. 18, 2014

(65) Prior Publication Data
US 2016/0140764 A1     May 19, 2016

(30) Foreign Application Priority Data

Jun. 11, 2013 (GB) .................................... 1310373.4
Aug. 21, 2013 (GB) .................................... 1314979.4

(51) Int. Cl.
*G06T 19/00* (2011.01)
*G06F 3/01* (2006.01)
(Continued)

(52) U.S. Cl.
CPC .......... *G06T 19/006* (2013.01); *A63F 13/212* (2014.09); *A63F 13/213* (2014.09);
(Continued)

(58) Field of Classification Search
CPC ......... G06T 19/006; G06T 19/20; G06T 7/70; G06T 2207/20076; G06T 2219/2004;
(Continued)

(56) References Cited

U.S. PATENT DOCUMENTS

2006/0193515 A1* 8/2006 Kim ................... G06K 9/00228
382/173
2006/0252477 A1 11/2006 Zalewski et al.
(Continued)

FOREIGN PATENT DOCUMENTS

| EP | 1521215 A1 | 4/2005 |
| EP | 1731943 A1 | 12/2006 |
| WO | 2012053141 A1 | 4/2012 |

OTHER PUBLICATIONS

Office Communication for European Application No. 14732309.1 dated Sep. 30, 2016, 9 pages.
(Continued)

*Primary Examiner* — Xilin Guo
(74) *Attorney, Agent, or Firm* — Lerner, David, Littenberg, Krumholz & Mentlik, LLP

(57) ABSTRACT

A head mountable display (HMD) includes a camera operable to capture images of a peripheral and/or control device in use by a wearer of the HMD. A detector of the HMD is configured to detect occlusions in a captured image of the peripheral and/or control device. And an image renderer of the HMD is configured to render a virtual version of the peripheral and/or control device for display to the HMD wearer and to render a representation of a user's hand at a position of a detected occlusion.

20 Claims, 14 Drawing Sheets

(51) Int. Cl.
| | | |
|---|---|---|
| *G06F 3/03* | (2006.01) | |
| *G06F 3/0346* | (2013.01) | |
| *G02B 27/01* | (2006.01) | |
| *A63F 13/428* | (2014.01) | |
| *A63F 13/23* | (2014.01) | |
| *A63F 13/213* | (2014.01) | |
| *A63F 13/5258* | (2014.01) | |
| *A63F 13/212* | (2014.01) | |
| *A63F 13/285* | (2014.01) | |
| *G06K 9/46* | (2006.01) | |
| *G06K 9/62* | (2006.01) | |
| *G06T 19/20* | (2011.01) | |
| *G06T 7/70* | (2017.01) | |
| *H04N 13/344* | (2018.01) | |
| *H04N 13/111* | (2018.01) | |

(52) U.S. Cl.
CPC ............ *A63F 13/23* (2014.09); *A63F 13/285* (2014.09); *A63F 13/428* (2014.09); *A63F 13/5258* (2014.09); *G02B 27/017* (2013.01); *G06F 3/011* (2013.01); *G06F 3/012* (2013.01); *G06F 3/016* (2013.01); *G06F 3/0304* (2013.01); *G06F 3/0346* (2013.01); *G06K 9/4652* (2013.01); *G06K 9/4661* (2013.01); *G06K 9/6202* (2013.01); *G06T 7/70* (2017.01); *G06T 19/20* (2013.01); *H04N 13/111* (2018.05); *H04N 13/344* (2018.05); *G02B 2027/014* (2013.01); *G02B 2027/0138* (2013.01); *G02B 2027/0187* (2013.01)

(58) Field of Classification Search
CPC ................. G06T 17/00; G06T 2200/04; G06T 2207/10028; G06T 2207/30244; G06T 2207/10004; G06T 2210/12; G06T 2215/16; G06T 7/11; G06F 3/012; G06F 3/016; G06F 3/011; G06F 3/0304; G06F 3/04842; G06F 3/005; G06F 2203/04113; G06F 3/0346; G06F 3/03547; G06F 3/04815; G06F 1/1423; G06F 1/169; G06F 3/017; G06F 3/04845; G06F 2203/04104; G06F 3/0484; G06K 9/4652; G06K 9/6202; G06K 9/4661; G02B 27/017; A63F 13/428; A63F 13/212

See application file for complete search history.

(56) References Cited

U.S. PATENT DOCUMENTS

| | | | |
|---|---|---|---|
| 2008/0096654 | A1 | 4/2008 | Mondesir et al. |
| 2008/0261693 | A1 | 10/2008 | Zalewski |
| 2008/0284864 | A1* | 11/2008 | Kotake ................ G06K 9/3216 348/222.1 |
| 2009/0128564 | A1* | 5/2009 | Okuno ................. G06T 19/006 345/427 |
| 2010/0079356 | A1 | 4/2010 | Hoellwarth |
| 2010/0157433 | A1 | 6/2010 | Mukawa et al. |
| 2010/0303291 | A1 | 12/2010 | Margolis |
| 2011/0291988 | A1* | 12/2011 | Bamji ................... G06F 3/0428 345/175 |
| 2012/0206452 | A1 | 8/2012 | Geisner et al. |
| 2013/0083063 | A1* | 4/2013 | Geisner .................. G06F 3/011 345/633 |
| 2015/0317527 | A1* | 11/2015 | Graumann .............. H04N 7/18 348/148 |

OTHER PUBLICATIONS

International Search Report for Application No. PCT/GB2014/051797 dated Oct. 14, 2014.
International Written Opinion for Application No. PCT/GB2014/051797 dated Oct. 14, 2014.
Examination report for EP Application No. 14732309.1 dated Mar. 28, 2018.

* cited by examiner

LEFT　　　　　　　　　RIGHT

HEAD-MOUNTABLE APPARATUS AND SYSTEMS

CROSS REFERENCE TO RELATED APPLICATION

The present application is a national phase entry under 35 U.S.C. § 371 of International Application No. PCT/GB2014/051797, filed Jun. 11, 2014, published in English, which claims the benefit of and priority to GB Patent Application No. 1310373.4, filed Jun. 11, 2013 and GB Patent Application No. 1314979.4, filed Aug. 21, 2013, the entire disclosures of which are hereby incorporated by reference herein.

BACKGROUND

Field of the Disclosure

This invention relates to head-mountable apparatus and systems.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

A head-mountable display (HMD) is one example of a head-mountable apparatus. Audio headphones comprising a frame supporting one or more audio transducers are another example of a head-mountable apparatus. A head-mounted torch or light is a further example of a head-mountable apparatus. The following background discussions will relate mainly to HMDs, but the principles are also applicable to other types of head-mountable apparatus.

In an HMD, an image or video display device is provided which may be worn on the head or as part of a helmet. Either one eye or both eyes are provided with small electronic display devices.

Some HMDs allow a displayed image to be superimposed on a real-world view. This type of HMD can be referred to as an optical see-through HMD and generally requires the display devices to be positioned somewhere other than directly in front of the user's eyes. Some way of deflecting the displayed image so that the user may see it is then required. This might be through the use of a partially reflective mirror placed in front of the user's eyes so as to allow the user to see through the mirror but also to see a reflection of the output of the display devices. In another arrangement, disclosed in EP-A-1 731 943 and US-A-2010/0157433, a waveguide arrangement employing total internal reflection is used to convey a displayed image from a display device disposed to the side of the user's head so that the user may see the displayed image but still see a view of the real world through the waveguide. Once again, in either of these types of arrangement, a virtual image of the display is created (using known techniques) so that the user sees the virtual image at an appropriate size and distance to allow relaxed viewing. For example, even though the physical display device may be tiny (for example, 10 mm×10 mm) and may be just a few millimetres from the user's eye, the virtual image may be arranged so as to be perceived by the user at a distance of (for example) 20 m from the user, having a perceived size of 5 m×5 m.

Other HMDs, however, allow the user only to see the displayed images, which is to say that they obscure the real world environment surrounding the user. This type of HMD can position the actual display devices in front of the user's eyes, in association with appropriate lenses or other optical components which place a virtual displayed image at a suitable distance for the user to focus in a relaxed manner—for example, at a similar virtual distance and perceived size as the optical see-through HMD described above. This type of device might be used for viewing movies or similar recorded content, or for viewing so-called virtual reality content representing a virtual space surrounding the user. It is of course however possible to display a real-world view on this type of HMD, for example by using a forward-facing camera to generate images for display on the display devices.

Although the original development of HMDs was perhaps driven by the military and professional applications of these devices, HMDs are becoming more popular for use by casual users in, for example, computer game or domestic computing applications.

The foregoing paragraphs have been provided by way of general introduction, and are not intended to limit the scope of the following claims. The described embodiments, together with further advantages, will be best understood by reference to the following detailed description taken in conjunction with the accompanying drawings.

Various aspects and features of the present invention are defined in the appended claims and within the text of the accompanying description and include at least a head mountable apparatus such as a display and a method of operating a head-mountable apparatus as well as a computer program.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Embodiments of the invention will now be described, by way of example only, with reference to the accompanying drawings, in which.

DESCRIPTION OF THE EMBODIMENTS

Figure 1:
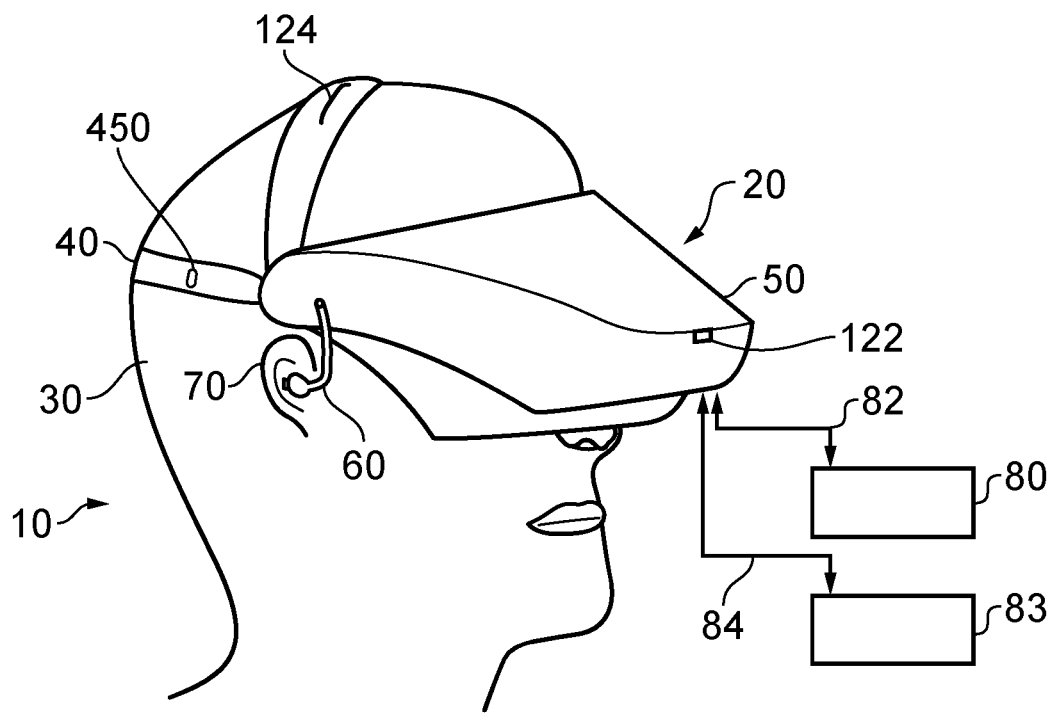
FIG. 1 schematically illustrates an HMD worn by a user.

Referring now to FIG. 1, a user 10 is wearing an HMD 20 (as an example of a generic head-mountable apparatus— other examples including, where the technical context allows, audio headphones or a head-mountable light source) on the user's head 30. The HMD comprises a frame 40, in this example formed of a rear strap and a top strap, and a display portion 50.

Note that the HMD of FIG. 1 may comprise further features, to be described below in connection with other drawings, but which are not shown in FIG. 1 for clarity of this initial explanation.

The HMD of FIG. 1 completely (or at least substantially completely) obscures the user's view of the surrounding environment. All that the user can see is the pair of images displayed within the HMD.

The HMD has associated headphone audio transducers or earpieces 60 which fit into the user's left and right ears 70. The earpieces 60 replay an audio signal provided from an external source, which may be the same as the video signal source which provides the video signal for display to the user's eyes.

The combination of the fact that the user can see only what is displayed by the HMD and, subject to the limitations of the noise blocking or active cancellation properties of the earpieces and associated electronics, can hear only what is provided via the earpieces, mean that this HMD may be considered as a so-called "full immersion" HMD. Note however that in some embodiments the HMD is not a full immersion HMD, and may provide at least some facility for the user to see and/or hear the user's surroundings. This could be by providing some degree of transparency or partial transparency in the display arrangements, and/or by projecting a view of the outside (captured using a camera, for example a camera mounted on the HMD) via the HMD's displays, and/or by allowing the transmission of ambient sound past the earpieces and/or by providing a microphone to generate an input sound signal (for transmission to the earpieces) dependent upon the ambient sound.

A front-facing camera 122 may capture images to the front of the HMD, in use. A Bluetooth® antenna 124 may provide communication facilities or may simply be arranged as a directional antenna to allow a detection of the direction of a nearby Bluetooth transmitter.

In operation, a video signal is provided for display by the HMD. This could be provided by an external video signal source 80 such as a video games machine or data processing apparatus (such as a personal computer), in which case the signals could be transmitted to the HMD by a wired or a wireless connection 82. Examples of suitable wireless connections include Bluetooth® connections. Audio signals for the earpieces 60 can be carried by the same connection. Similarly, any control signals passed from the HMD to the video (audio) signal source may be carried by the same connection. Furthermore, a power supply 83 (including one or more batteries and/or being connectable to a mains power outlet) may be linked by a cable 84 to the HMD. Note that the power supply 83 and the video signal source 80 may be separate units or may be embodied as the same physical unit. There may be separate cables for power and video (and indeed for audio) signal supply, or these may be combined for carriage on a single cable (for example, using separate conductors, as in a USB cable, or in a similar way to a "power over Ethernet" arrangement in which data is carried as a balanced signal and power as direct current, over the same collection of physical wires). The video and/or audio signal may be carried by, for example, an optical fibre cable. In other embodiments, at least part of the functionality associated with generating image and/or audio signals for presentation to the user may be carried out by circuitry and/or processing forming part of the HMD itself. A power supply may be provided as part of the HMD itself.

Some embodiments of the invention are applicable to an HMD having at least one electrical and/or optical cable linking the HMD to another device, such as a power supply and/or a video (and/or audio) signal source. So, embodiments of the invention can include, for example:

(a) an HMD having its own power supply (as part of the HMD arrangement) but a cabled connection to a video and/or audio signal source;

(b) an HMD having a cabled connection to a power supply and to a video and/or audio signal source, embodied as a single physical cable or more than one physical cable;

(c) an HMD having its own video and/or audio signal source (as part of the HMD arrangement) and a cabled connection to a power supply; or (d) an HMD having a wireless connection to a video and/or audio signal source and a cabled connection to a power supply.

If one or more cables are used, the physical position at which the cable 82 and/or 84 enters or joins the HMD is not particularly important from a technical point of view. Aesthetically, and to avoid the cable(s) brushing the user's face in operation, it would normally be the case that the cable(s) would enter or join the HMD at the side or back of the HMD (relative to the orientation of the user's head when worn in normal operation). Accordingly, the position of the cables 82, 84 relative to the HMD in FIG. 1 should be treated merely as a schematic representation.

Accordingly, the arrangement of FIG. 1 provides an example of a head-mountable display system comprising a frame to be mounted onto an observer's head, the frame defining one or two eye display positions which, in use, are positioned in front of a respective eye of the observer and a display element mounted with respect to each of the eye display positions, the display element providing a virtual image of a video display of a video signal from a video signal source to that eye of the observer.

FIG. 1 shows just one example of an HMD. Other formats are possible: for example an HMD could use a frame more similar to that associated with conventional eyeglasses, namely a substantially horizontal leg extending back from the display portion to the top rear of the user's ear, possibly curling down behind the ear. In other (not full immersion) examples, the user's view of the external environment may not in fact be entirely obscured; the displayed images could be arranged so as to be superposed (from the user's point of view) over the external environment. An example of such an arrangement will be described below with reference to FIG. 4.

In the example of FIG. 1, a separate respective display is provided for each of the user's eyes. A schematic plan view of how this is achieved is provided as FIG. 2, which illustrates the positions 100 of the user's eyes and the relative position 110 of the user's nose. The display portion 50, in schematic form, comprises an exterior shield 120 to mask ambient light from the user's eyes and an internal shield 130 which prevents one eye from seeing the display intended for the other eye. The combination of the user's face, the exterior shield 120 and the interior shield 130 form two compartments 140, one for each eye. In each of the compartments there is provided a display element 150 and one or more optical elements 160. The way in which the display element and the optical element(s) cooperate to provide a display to the user will be described with reference to FIG. 3.

Figure 3:
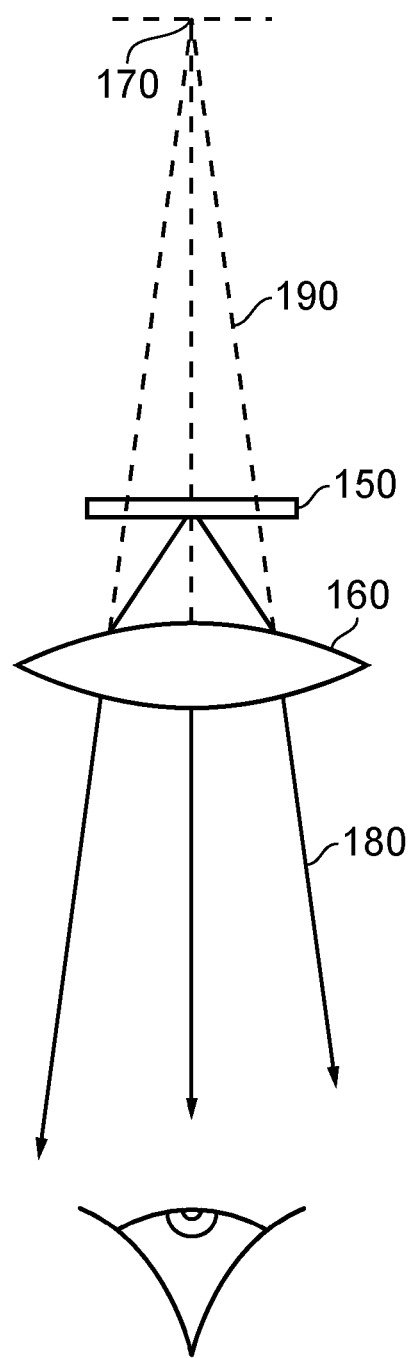
FIG. 3 schematically illustrates the formation of a virtual image by an HMD.

Referring to FIG. 3, the display element 150 generates a displayed image which is (in this example) refracted by the optical elements 160 (shown schematically as a convex lens but which could include compound lenses or other elements) so as to generate a virtual image 170 which appears to the user to be larger than and significantly further away than the real image generated by the display element 150. As an example, the virtual image may have an apparent image size (image diagonal) of more than 1 m and may be disposed at a distance of more than 1 m from the user's eye (or from the frame of the HMD). In general terms, depending on the purpose of the HMD, it is desirable to have the virtual image disposed a significant distance from the user. For example, if the HMD is for viewing movies or the like, it is desirable that the users eyes are relaxed during such viewing, which requires a distance (to the virtual image) of at least several metres. In FIG. 3, solid lines (such as the line 180) are used to denote real optical rays, whereas broken lines (such as the line 190) are used to denote virtual rays.

Figure 4:
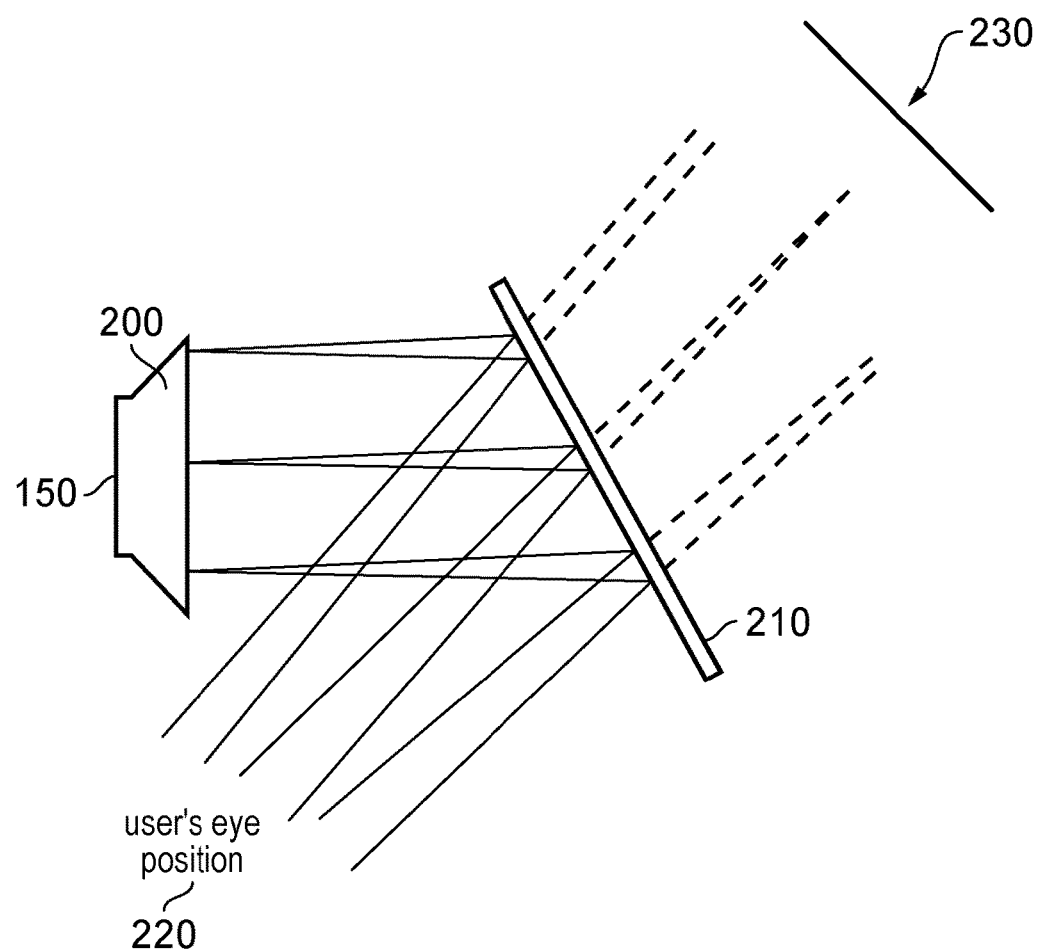
FIG. 4 schematically illustrates another type of display for use in an HMD.

An alternative arrangement is shown in FIG. 4. This arrangement may be used where it is desired that the user's view of the external environment is not entirely obscured. However, it is also applicable to HMDs in which the users external view is wholly obscured. In the arrangement of FIG. 4, the display element 150 and optical elements 200 cooperate to provide an image which is projected onto a mirror 210, which deflects the image towards the users eye position 220. The user perceives a virtual image to be located at a position 230 which is in front of the user and at a suitable distance from the user.

In the case of an HMD in which the user's view of the external surroundings is entirely obscured, the mirror 210 can be a substantially 100% reflective mirror. The arrangement of FIG. 4 then has the advantage that the display element and optical elements can be located closer to the centre of gravity of the user's head and to the side of the user's eyes, which can produce a less bulky HMD for the user to wear. Alternatively, if the HMD is designed not to completely obscure the user's view of the external environment, the mirror 210 can be made partially reflective so that the user sees the external environment, through the mirror 210, with the virtual image superposed over the real external environment.

Figure 5:
FIG. 5 schematically illustrates a pair of stereoscopic images.

In the case where separate respective displays are provided for each of the user's eyes, it is possible to display stereoscopic images. An example of a pair of stereoscopic images for display to the left and right eyes is shown in FIG. 5. The images exhibit a lateral displacement relative to one another, with the displacement of image features depending upon the (real or simulated) lateral separation of the cameras by which the images were captured, the angular convergence of the cameras and the (real or simulated) distance of each image feature from the camera position.

Note that the lateral displacements in FIG. 5 could in fact be the other way round, which is to say that the left eye image as drawn could in fact be the right eye image, and the right eye image as drawn could in fact be the left eye image. This is because some stereoscopic displays tend to shift objects to the right in the right eye image and to the left in the left eye image, so as to simulate the idea that the user is looking through a stereoscopic window onto the scene beyond. However, some HMDs use the arrangement shown in FIG. 5 because this gives the impression to the user that the user is viewing the scene through a pair of binoculars. The choice between these two arrangements is at the discretion of the system designer.

In some situations, an HMD may be used simply to view movies and the like. In this case, there is no change required to the apparent viewpoint of the displayed images as the user turns the user's head, for example from side to side. In other uses, however, such as those associated with virtual reality (VR) or augmented reality (AR) systems, the user's viewpoint needs to track movements with respect to a real or virtual space in which the user is located.

Figure 6:
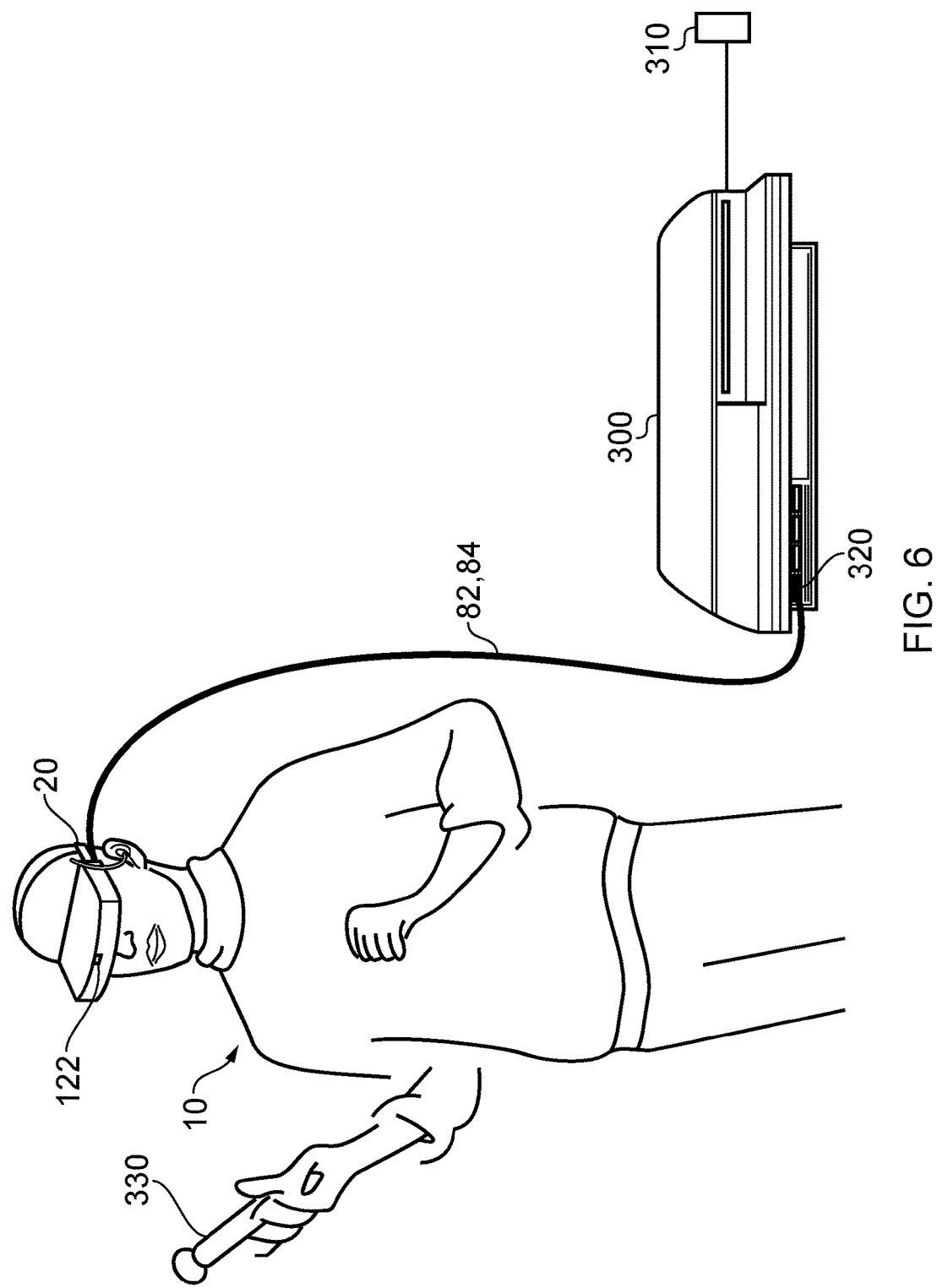
FIGS. 6 and 7 schematically illustrate a user wearing an HMD connected to a Sony® PlayStation 3® games console.

FIG. 6 schematically illustrates a user wearing an HMD connected to a Sony® PlayStation 3® games console 300 as an example of a base device. The games console 300 is connected to a mains power supply 310 and (optionally) to a main display screen (not shown). A cable, acting as the cables 82, 84 discussed above (and so acting as both power supply and signal cables), links the HMD 20 to the games console 300 and is, for example, plugged into a USB socket 320 on the console 300. Note that in the present embodiments, a single physical cable is provided which fulfils the functions of the cables 82, 84. In FIG. 6, the user is also shown holding a hand-held controller 330 which may be, for example, a Sony® Move® controller which communicates wirelessly with the games console 300 to control (or to contribute to the control of) game operations relating to a currently executed game program.

The video displays in the HMD 20 are arranged to display images generated by the games console 300, and the earpieces 60 in the HMD 20 are arranged to reproduce audio signals generated by the games console 300. Note that if a USB type cable is used, these signals will be in digital form when they reach the HMD 20, such that the HMD 20 comprises a digital to analogue converter (DAC) to convert at least the audio signals back into an analogue form for reproduction.

Images from the camera 122 mounted on the HMD 20 are passed back to the games console 300 via the cable 82, 84. Similarly, if motion or other sensors are provided at the HMD 20, signals from those sensors may be at least partially processed at the HMD 20 and/or may be at least partially processed at the games console 300. The use and processing of such signals will be described further below.

The USB connection from the games console 300 also provides power to the HMD 20, according to the USB standard.

Figure 7:
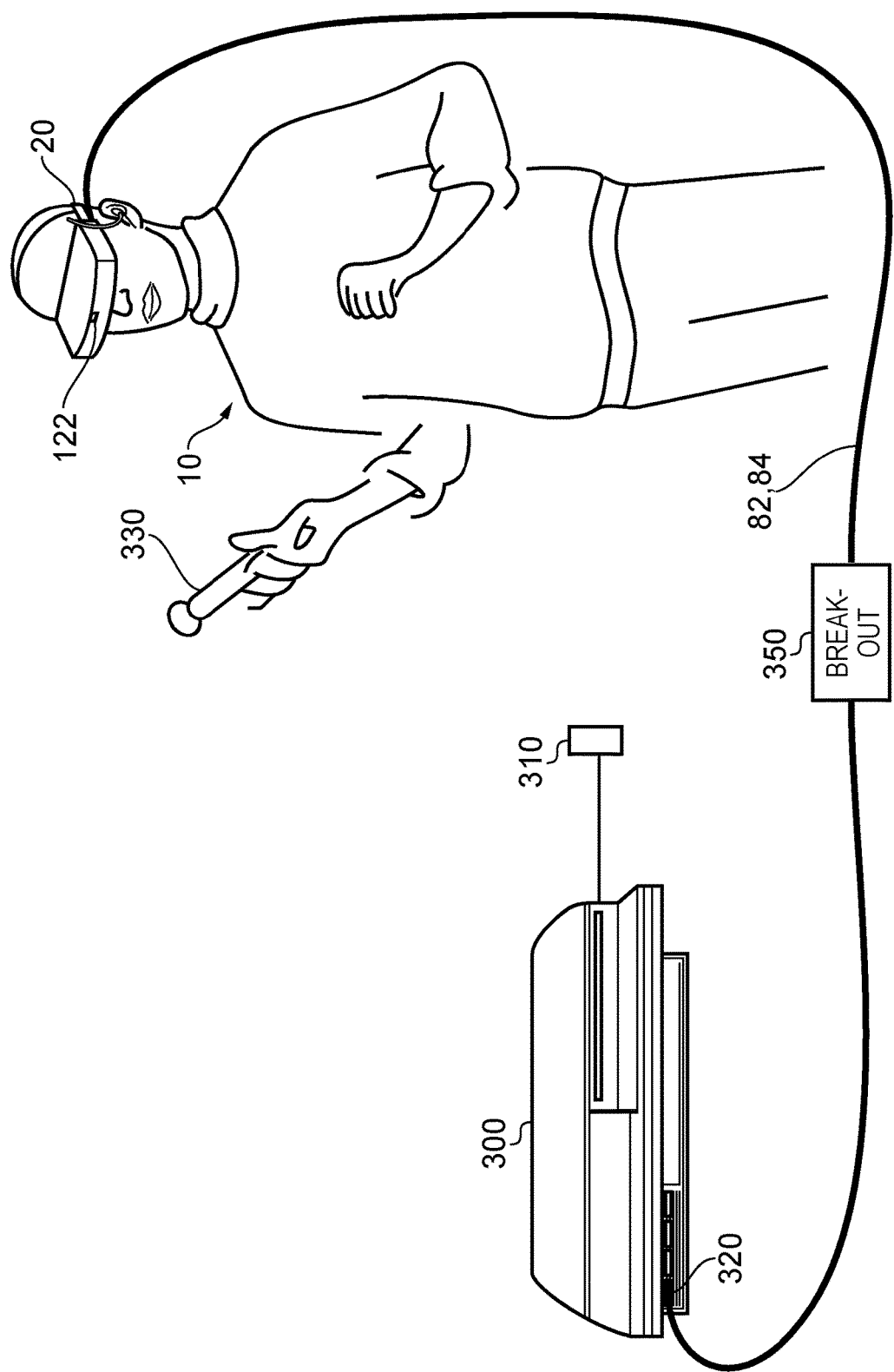

FIG. 7 schematically illustrates a similar arrangement in which the games console is connected (by a wired or wireless link) to a so-called "break out box" acting as a base or intermediate device 350, to which the HMD 20 is connected by a cabled link 82,84. The breakout box has various functions in this regard. One function is to provide a location, near to the user, for some user controls relating to the operation of the HMD, such as (for example) one or more of a power control, a brightness control, an input source selector, a volume control and the like. Another function is to provide a local power supply for the HMD (if one is needed according to the embodiment being discussed). Another function is to provide a local cable anchoring point. In this last function, it is not envisaged that the break-out box 350 is fixed to the ground or to a piece of furniture, but rather than having a very long trailing cable from the games console 300, the break-out box provides a locally weighted point so that the cable 82, 84 linking the HMD 20 to the break-out box will tend to move around the position of the break-out box. This can improve user safety and comfort by avoiding the use of very long trailing cables.

It will be appreciated that the localisation of processing in the various techniques described in this application can be varied without changing the overall effect, given that an HMD may form part of a set or cohort of interconnected devices (that is to say, interconnected for the purposes of data or signal transfer, but not necessarily connected by a physical cable). So, processing which is described as taking place "at" one device, such as at the HMD, could be devolved to another device such as the games console (base device) or the break-out box. Processing tasks can be shared amongst devices. Source signals, on which the processing is to take place, could be distributed to another device, or the processing results from the processing of those source signals could be sent to another device, as required. So any references to processing taking place at a particular device should be understood in this context. Similarly, where an interaction between two devices is basically symmetrical, for example where a camera or sensor on one device detects a signal or feature of the other device, it will be understood that unless the context prohibits this, the two devices could be interchanged without any loss of functionality.

As mentioned above, in some uses of the HMD, such as those associated with virtual reality (VR) or augmented reality (AR) systems, the user's viewpoint needs to track movements with respect to a real or virtual space in which the user is located.

This tracking is carried out by detecting motion of the HMD and varying the apparent viewpoint of the displayed images so that the apparent viewpoint tracks the motion.

Figure 8:
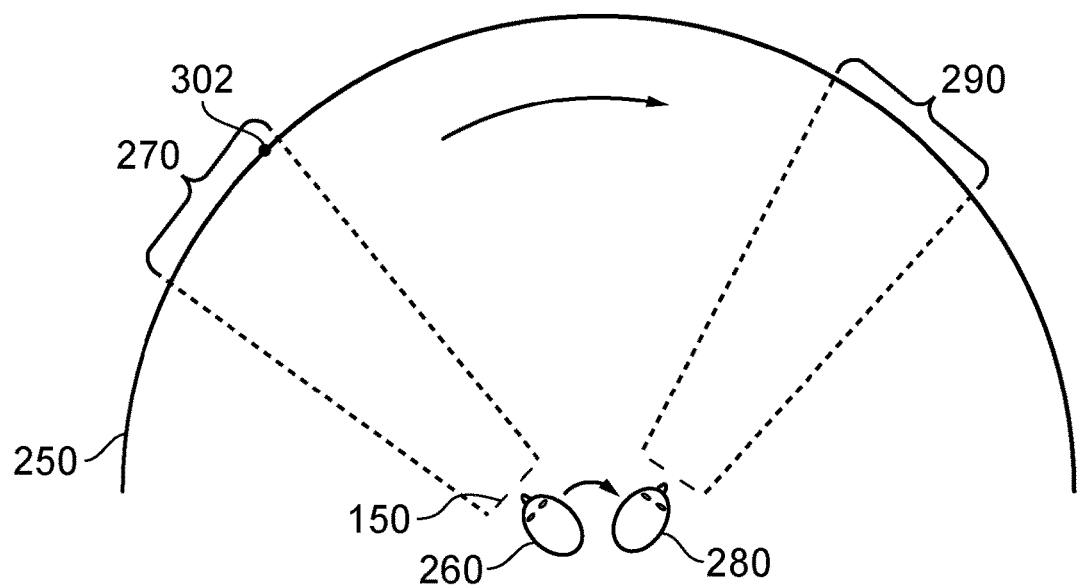
FIG. 8 schematically illustrates a change of view of user of an HMD.

FIG. 8 schematically illustrates the effect of a user head movement in a VR or AR system.

Referring to FIG. 8, a virtual environment is represented by a (virtual) spherical shell 250 around a user. Because of the need to represent this arrangement on a two-dimensional paper drawing, the shell is represented by a part of a circle, at a distance from the user equivalent to the separation of the displayed virtual image from the user. A user is initially at a first position 260 and is directed towards a portion 270 of the virtual environment. It is this portion 270 which is represented in the images displayed on the display elements 150 of the user's HMD.

Consider the situation in which the user then moves his head to a new position and/or orientation 280. In order to maintain the correct sense of the virtual reality or augmented reality display, the displayed portion of the virtual environment also moves so that, at the end of the movement, a new portion 290 is displayed by the HMD.

So, in this arrangement, the apparent viewpoint within the virtual environment moves with the head movement. If the head rotates to the right side, for example, as shown in FIG. 8, the apparent viewpoint also moves to the right from the user's point of view. If the situation is considered from the aspect of a displayed object, such as a displayed object 300, this will effectively move in the opposite direction to the head movement. So, if the head movement is to the right, the apparent viewpoint moves to the right but an object such as the displayed object 300 which is stationary in the virtual environment will move towards the left of the displayed image and eventually will disappear off the left-hand side of the displayed image, for the simple reason that the displayed portion of the virtual environment has moved to the right whereas the displayed object 300 has not moved in the virtual environment.

Figure 2:
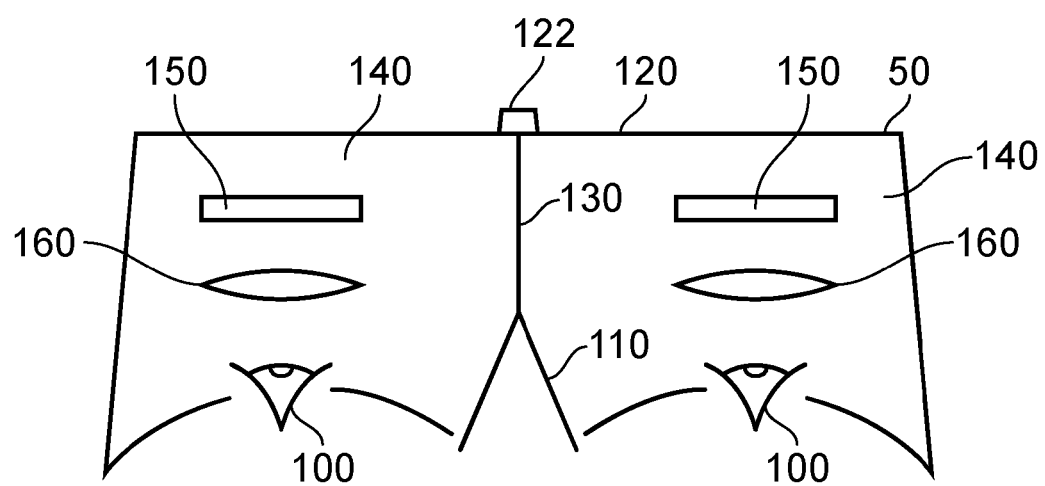
FIG. 2 is a schematic plan view of an HMD.
Figure 9A:
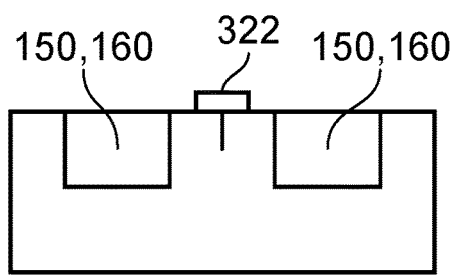
FIGS. 9a and 9b schematically illustrate HMDs with motion sensing.
Figure 9B:
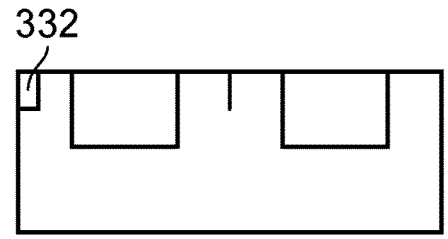

FIGS. 9a and 9b schematically illustrated HMDs with motion sensing. The two drawings are in a similar format to that shown in FIG. 2. That is to say, the drawings are schematic plan views of an HMD, in which the display element 150 and optical elements 160 are represented by a simple box shape. Many features of FIG. 2 are not shown, for clarity of the diagrams. Both drawings show examples of HMDs with a motion detector for detecting motion of the observer's head.

In FIG. 9a, a forward-facing camera 322 is provided on the front of the HMD. This may be the same camera as the camera 122 discussed above, or may be an additional camera. This does not necessarily provide images for display to the user (although it could do so in an augmented reality arrangement). Instead, its primary purpose in the present embodiments is to allow motion sensing. A technique for using images captured by the camera 322 for motion sensing will be described below in connection with FIG. 10. In these arrangements, the motion detector comprises a camera mounted so as to move with the frame; and an image comparator operable to compare successive images captured by the camera so as to detect inter-image motion.

FIG. 9b makes use of a hardware motion detector 332. This can be mounted anywhere within or on the HMD. Examples of suitable hardware motion detectors are piezoelectric accelerometers or optical fibre gyroscopes. It will of course be appreciated that both hardware motion detection and camera-based motion detection can be used in the same device, in which case one sensing arrangement could be used as a backup when the other one is unavailable, or one sensing arrangement (such as the camera) could provide data for changing the apparent viewpoint of the displayed images, whereas the other (such as an accelerometer) could provide data for image stabilisation.

Figure 10:
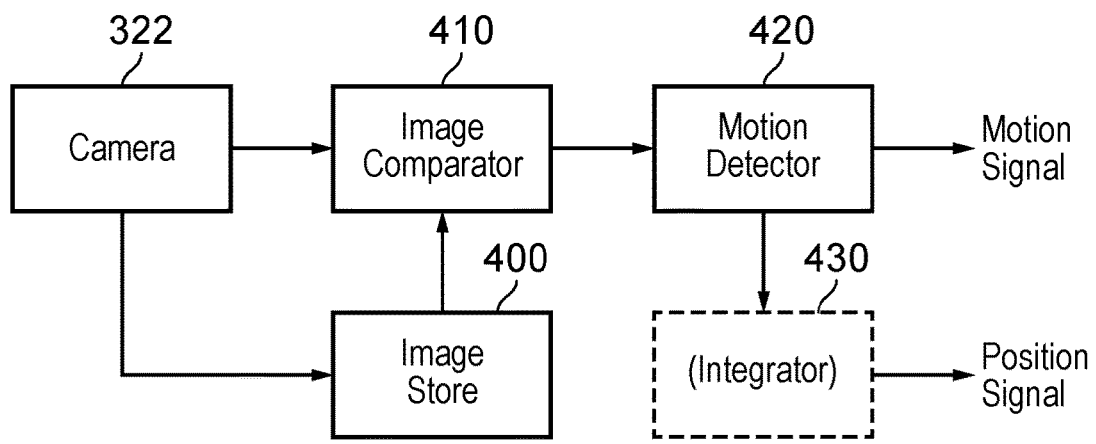
FIG. 10 schematically illustrates a position sensor based on optical flow detection.

FIG. 10 schematically illustrates one example of motion detection using the camera 322 of FIG. 9a.

The camera 322 is a video camera, capturing images at an image capture rate of, for example, 25 images per second. As each image is captured, it is passed to an image store 400 for storage and is also compared, by an image comparator 410, with a preceding image retrieved from the image store. The comparison uses known block matching techniques (so-called "optical flow" detection) to establish whether substantially the whole image has moved since the time at which the preceding image was captured. Localised motion might indicate moving objects within the field of view of the camera 322, but global motion of substantially the whole image would tend to indicate motion of the camera rather than of individual features in the captured scene, and in the present case because the camera is mounted on the HMD, motion of the camera corresponds to motion of the HMD and in turn to motion of the user's head.

The displacement between one image and the next, as detected by the image comparator 410, is converted to a signal indicative of motion by a motion detector 420. If required, the motion signal is converted by to a position signal by an integrator 430.

As mentioned above, as an alternative to, or in addition to, the detection of motion by detecting inter-image motion between images captured by a video camera associated with the HMD, the HMD can detect head motion using a mechanical or solid state detector 332 such as an accelerometer. This can in fact give a faster response in respect of the indication of motion, given that the response time of the video-based system is at best the reciprocal of the image capture rate. In some instances, therefore, the detector 332 can be better suited for use with higher frequency motion detection. However, in other instances, for example if a high image rate camera is used (such as a 200 Hz capture rate camera), a camera-based system may be more appropriate. In terms of FIG. 10, the detector 332 could take the place of the camera 322, the image store 400 and the comparator 410, so as to provide an input directly to the motion detector 420. Or the detector 332 could take the place of the motion detector 420 as well, directly providing an output signal indicative of physical motion.

Other position or motion detecting techniques are of course possible. For example, a mechanical arrangement by which the HMD is linked by a moveable pantograph arm to a fixed point (for example, on a data processing device or on a piece of furniture) may be used, with position and orientation sensors detecting changes in the deflection of the pantograph arm. In other embodiments, a system of one or more transmitters and receivers, mounted on the HMD and on a fixed point, can be used to allow detection of the position and orientation of the HMD by triangulation techniques. For example, the HMD could carry one or more directional transmitters, and an array of receivers associated with known or fixed points could detect the relative signals from the one or more transmitters. Or the transmitters could be fixed and the receivers could be on the HMD. Examples of transmitters and receivers include infra-red transducers, ultrasonic transducers and radio frequency transducers. The radio frequency transducers could have a dual purpose, in that they could also form part of a radio frequency data link to and/or from the HMD, such as a Bluetooth® link.

Figure 11:
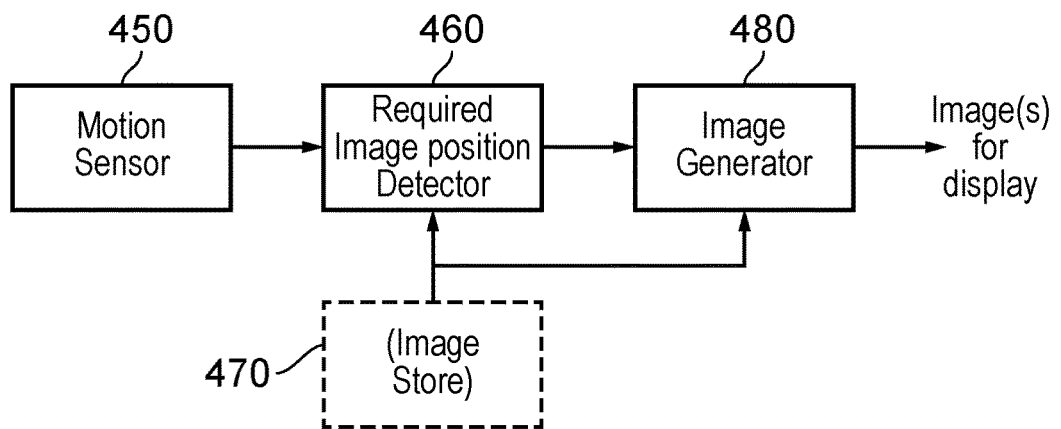
FIG. 11 schematically illustrates the generation of images in response to HMD position or motion detection.

FIG. 11 schematically illustrates image processing carried out in response to a detected position or change in position of the HMD.

As mentioned above in connection with FIG. 10, in some applications such as virtual reality and augmented reality arrangements, the apparent viewpoint of the video being displayed to the user of the HMD is changed in response to a change in actual position or orientation of the user's head.

With reference to FIG. 11, this is achieved by a motion sensor 450 (such as the arrangement of FIG. 10 and/or the motion detector 332 of FIG. 9b) supplying data indicative of motion and/or current position to a required image position detector 460, which translates the actual position of the HMD into data defining the required image for display. An image generator 480 accesses image data stored in an image store 470 if required, and generates the required images from the appropriate viewpoint for display by the HMD. The external video signal source can provide the functionality of the image generator 480 and act as a controller to compensate for the lower frequency component of motion of the observer's head by changing the viewpoint of the displayed image so as to move the displayed image in the opposite direction to that of the detected motion so as to change the apparent viewpoint of the observer in the direction of the detected motion.

Figure 12:
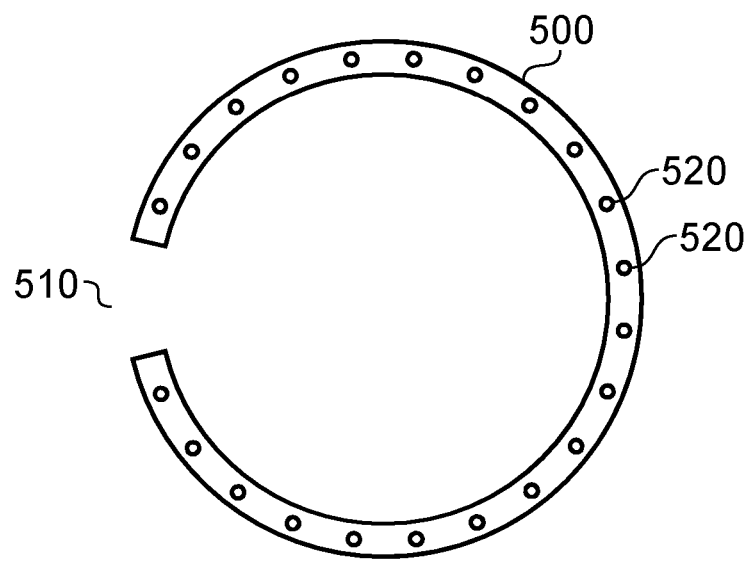
FIG. 12 schematically illustrates an example peripheral device as viewed by the camera of the HMD.

FIG. 12 schematically illustrates an example peripheral device as viewed by the camera of the HMD for example by using the forward facing camera 122 or 322.

In this example, the peripheral device is a steering wheel 500 for use by the user in playing (for example) a driving game or the like. The steering wheel may have electronic sensors to detect its rotational position, with that information being transmitted back to the HMD, the break-out box or the games console as telemetry data. The transmitted position can then be used as part of the controls of the game functionality. However, in other arrangements, the rotational position may be detected optically. This will be described below.

A feature of the captured images of the steering wheel, such as that shown in FIG. 12, is that the wheel has a gap 510. As it is drawn in FIG. 12, the gap is simply shown as a missing portion of the steering wheel 500. However, in a real image, the 510 would be filled with other image material, such that a "gap" is simply defined as a portion of the image where the wheel is expected but is not found to be present. In other words, the gap represents an occlusion of the steering wheel from the point of view of the HMD camera. The physical steering wheel control is a continuous annulus of (for example) plastics material.

The occlusion of the steering wheel can be detected by known image processing techniques which detect the presence of the circular pattern corresponding to the annular shape of the wheel, and detect missing portions of that circular pattern. In other embodiments, the steering wheel may be provided with passive markings or illuminations 520 which can be used as part of the image processing function to detect the shape of the steering wheel and also the occlusion brackets as represented by the non-detection of one or more of the expected passive markings or illuminations 520.

The passive markings or illuminations 520 can also be used to allow detection of the rotational position of the steering wheel 500 from the captured images. In some embodiments, the markings or illuminations may be identical with one another, and are tracked (in terms of their rotational position in the image) from image to image. This gives an indication of the rotational movement of the steering wheel control but not its absolute position. In other embodiments, at least some of the markings or illuminations may be distinguishable from one another in a captured image, such that the absolute rotational position may be detected from the positions of the markings or illuminations in the captured image.

In the present embodiments, the occlusion 510 may be assumed to represent the position at which the user is holding the physical steering wheel control with the user's hand. In turn, the system (of the HMD, the games console and optionally the break-out box) renders a virtual version of the steering wheel control, with a virtual hand and arm rendered at the appropriate position.

Alternatively, the occlusion 510 could be used to control further image processing, by which the system (for example, a processor 800 to be discussed below) detects skin colours in the region of the occlusion, and on the basis that the skin colours may represent the user's hand, keys the image data for pixels having those skin colours into the rendered image. The search for skin tones could start at the occlusion and continue outwards in each direction until non skin-coloured pixels are found. If this results in more than a threshold portion of the image being detected as having a skin colour, then the process may be abandoned and a virtual hand used. Otherwise, the skin colours are assumed to represent the user's hand and it is then keyed into the rendered image at the position corresponding to the occlusion.

A skin colour may be defined as a predetermined set of colours, or may be obtained for the particular user by a calibration process in which the user is asked to hold his hand in a certain position with respect to the camera. Alternatively, the user can wear a coloured glove.

This arrangement provides the advantage of providing a more realistic representation of the user's hands.

In a further embodiment, the user's skin colour could be sampled at the position of the occlusion, and used to control a colour with which the virtual hands are rendered.

Figure 13:
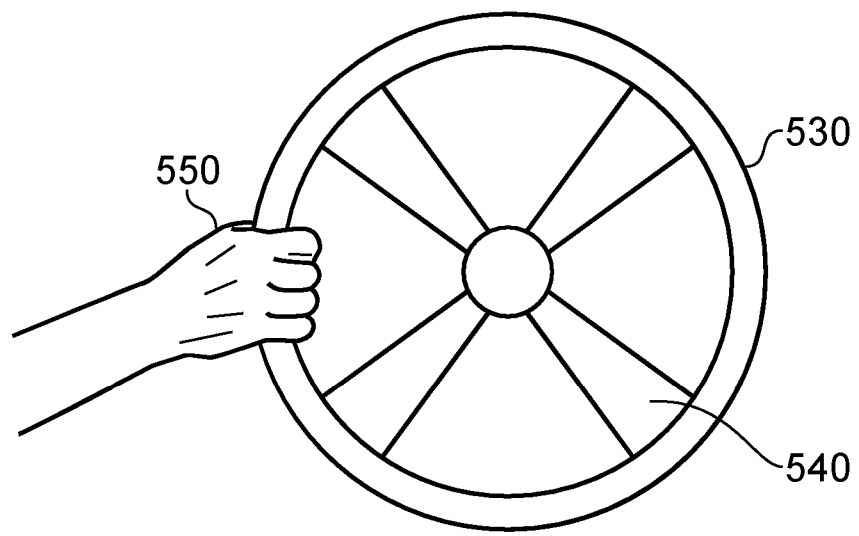
FIG. 13 schematically illustrates a version of the peripheral of FIG. 12 as rendered for display to the HMD user.

FIG. 13 schematically illustrates a version 530 of the peripheral of FIG. 12 as rendered for display to the HMD user. The virtual steering wheel 530 can be rendered to include virtual features (such as decorative spokes 540) not present in the physical steering wheel control. At the position of the occlusion 510, a virtual hand and arm 550 are rendered. If the occlusion is on the left-hand side of the physical steering wheel, a left hand and arm are rendered. If the occlusion is on the right-hand side of the physical steering wheel, a right hand and arm are rendered. If the occlusion is in a region at the top or the bottom of the steering wheel, then the decision as to which hand should be rendered can be based upon either or both of (a) information relating to the current user indicating the current user's dominant hand (for example, acquired as part of a control setup and calibration operation), and (b) the current direction of rotational movement of the steering wheel, so that if the physical steering wheel is moving clockwise, a hand at the top of the wheel is considered to be a right-hand, whereas a hand at the bottom of the wheel is considered to be a left-hand, with the opposite applying in the case of anti-clockwise motion.

Because the forward-facing camera 122/322 of the HMD has a fixed spatial relationship to the displays of the HMD, it is possible for the system to render the virtual steering wheel at a realistic image position, which is to say that the virtual steering wheel appears, in the displayed images, at substantially the same position that the real steering wheel would appear if the user were not wearing the HMD.

To deal with possible false occlusions, for example caused by intervening objects blocking the HMD camera's view of the steering wheel, the physical steering wheel peripheral control may have an array of touch or pressure sensors disposed around the periphery of the wheel 500 to detect the presence of a hand touching the wheel at that position. Data from the sensors may be transmitted from the peripheral device to the HMD as part of the peripheral device's telemetry data. If the camera images indicate an occlusion but the wheel sensors do not indicate the presence of a hand, then the system does not render a hand and arm.

Another way to detect false occlusions is to use another camera, for example mounted with respect to the break-out box, to view the steering wheel peripheral, with images from that other camera being image-processed to detect the user's arms and hands contacting the steering wheel.

A further way of detecting false occlusions, and indeed of detecting whether the system has incorrectly located or detected a touch of any peripheral, is to assume that only two hands are involved in the playing of the game (that is to say, the user is not being assisted by another person to operate the controls). Accordingly, if a button or joystick control is detected such that both of the user's hands are occupied by operating other controls, the system can treat the occlusion of the steering wheel as a false occlusion and not render the hand or arm.

Figure 14:
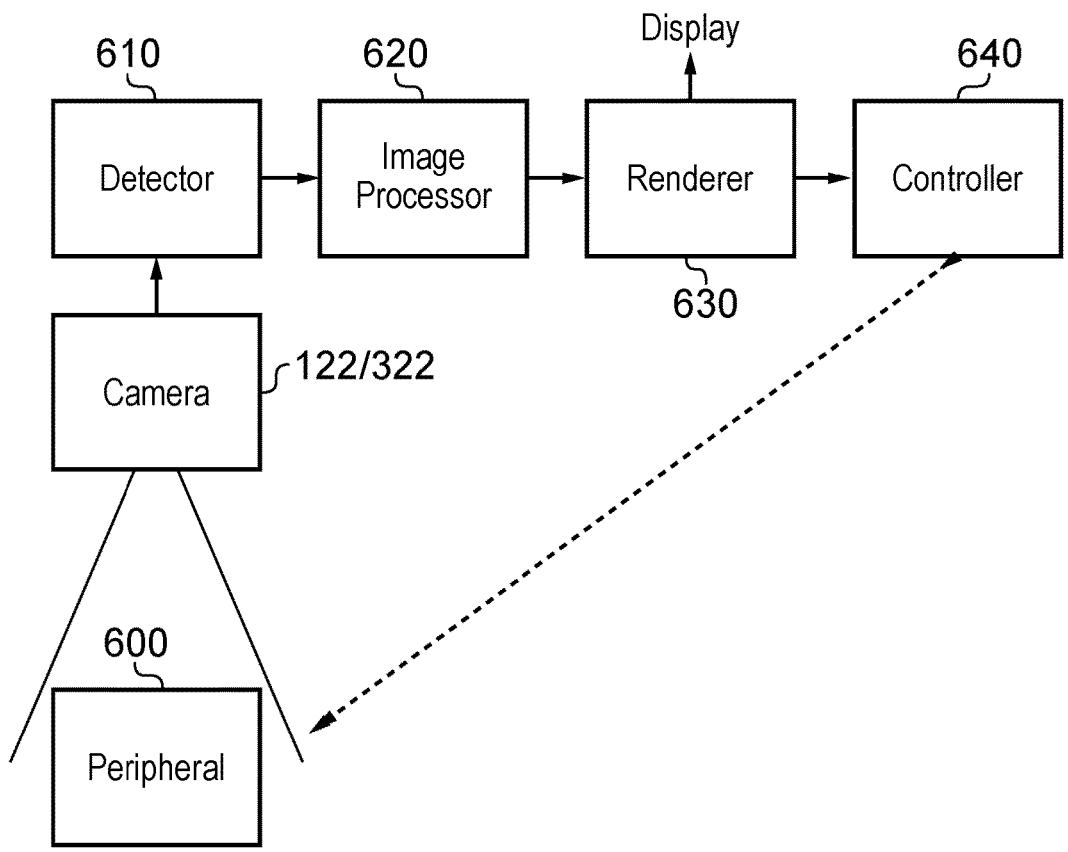
FIG. 14 schematically illustrates part of the functionality of an HMD.

FIG. 14 schematically illustrates part of the functionality of an HMD.

The HMD comprises a forward-facing camera 122/322 as discussed above, and this camera is, in the present arrangement, viewing a peripheral control device 600 disposed in front of the user. An example of such a peripheral control device is a steering wheel as discussed above, but many other such devices may be considered, such as a weapon, a bat or racquet, a gearstick, a handlebar and the like.

Images captured by the camera 122/322 are supplied to a detector 610 and an image processor 620. These devices share the functionality of deriving detail from the image in the manner discussed above. In one example, the detector 610 is operable to detect the general location of the peripheral device by shape matching and/or detecting markers or illuminations associated with the device, and the image processor 620 is operable to detect movements of the device and occlusions of it.

The image processor 620 passes information to a renderer 630 which generates a virtual version of the peripheral for display to the user. Note that although this would normally be a virtual representation of the same type of control device as the physical control, this need not be the case. So, the peripheral could be a simple hand-held structure similar perhaps to the Sony PlayStation Move™ controller, but the rendered image could take on various different shapes such as a bat, racquet, weapon and the like, rendered at the detected position of the peripheral.

The renderer 630 is operable to render additional features such as a hand and arm at the position of a detected occlusion of the peripheral 600, unless that occlusion is detected (as discussed above) to be a false occlusion.

As a further optional feature, a controller 640 may send control data to the peripheral 600 in dependence upon the detection of an occlusion. If an occlusion is detected, the controller 640 controls the peripheral 600 to use haptic feedback for the user, such as vibration or rumble device is within the peripheral 600. If no occlusion is detected, such that it may be assumed that the user is not touching the peripheral 600, the controller 640 controls the peripheral 600 not to use such haptic feedback, in order to save peripheral battery power.

Figure 15:
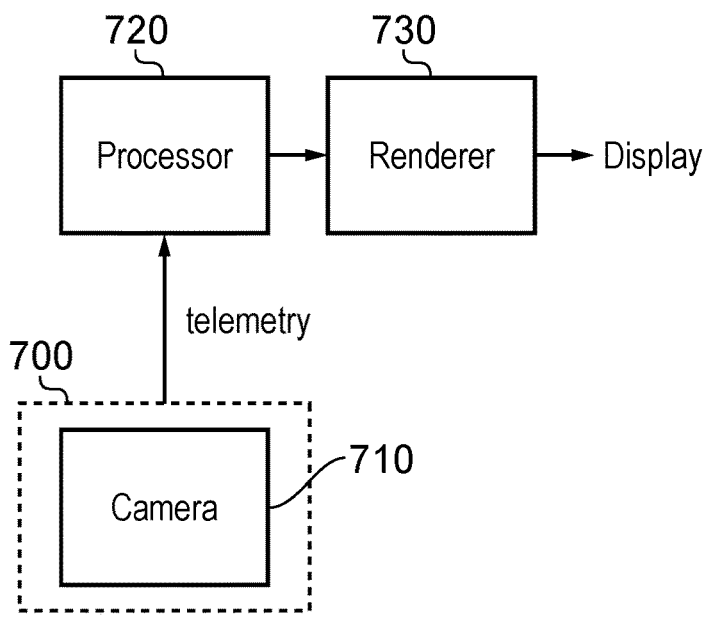
FIG. 15 schematically illustrates part of the functionality of a hand held peripheral device.

The arrangements discussed above assume that the camera is provided as part of the HMD. FIG. 15 schematically illustrates part of the functionality of a hand held peripheral device 700 which makes use of a camera 710 associated with the handheld peripheral device. Note that the peripheral device may be a specific gaming device such as a steering wheel control or a hand-held game controller such as the Sony Six-axis® controller, or may be, for example, a generic device such as a mobile telephone.

In operation, the camera 710 of the peripheral device captures images of the HMD, assuming the peripheral device is held by the user in front of the HMD, and either processes those images itself or (as shown in FIG. 15) passes data relating to those images by telemetry (for example, wireless telemetry) to a processor 720 associated with the HMD. The processor 720 detects the position of the peripheral device 700 with respect to the HMD and passes data to a renderer 730 which renders a virtual version of the peripheral device at the appropriate position according to the data received from the processor 720.

Note that the arrangement shown in FIG. 15 can be used in order for the relative position of the HMD and the break-out box to be established, but in this instance, the camera 710 would be the HMD camera or a camera associated with the break-out box, and the presence in a captured image of the other of the HMD and the break-out box is detected.

Figure 16:
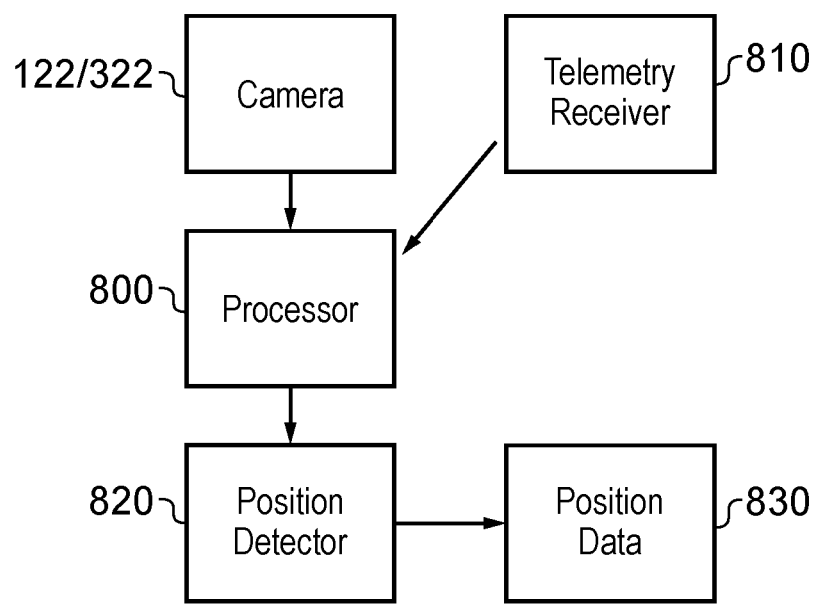
FIG. 16 schematically illustrates an arrangement for position detection of a peripheral device.

FIG. 16 schematically illustrates an arrangement for position detection of a peripheral device. This example shows detection by the camera 122/322 of the HMD, but would be equally applicable to detection by a camera associated with the break-out box. In FIG. 16, the camera 122/322 provides captured images, and a processor 800 detects the presence of a peripheral device in the captured images. The processor 800 also receives data from a telemetry receiver 810, the data originating from the peripheral device detected in the captured images. A position detector 820 detects the position, relative to the HMD, of the peripheral device. The primary detection is from the captured images, but the telemetry data from the telemetry receiver 810 is used to reinforce the position detection. This is done by detecting whether the telemetry data indicates that the user is touching any controls associated with the peripheral device. If so, the position detector 820 determines that the peripheral device is not out of the user's reach, or in other words it must be within about 1 m of the HMD. If the position is detected from the captured images conflicts with that assertion, then the position detector 820 either does not output position data 830 relating to that peripheral or alternatively flags the detected position data 832 indicate that it is potentially incorrect.

Note that if multiple peripheral devices are present, each device could detect the relative position of one or more other devices (including the HMD within the group of devices).

FIGS. 14 to 16 therefore provide examples of a head mountable display (HMD) system comprising: a camera configured to capture images of a peripheral and/or control device in use by a wearer of the HMD; a detector configured to detect occlusions in a captured image of the peripheral and/or control device; and an image renderer configured to render a virtual version of the peripheral and/or control device for display to the HMD wearer and to render a representation of a user's hand at the position of a detected occlusion. The detector and the image renderer can be implemented as discussed with reference to FIGS. 14 to 16, or more generally by one or more processors associated with the HMD, the games machine and/or the break-out box (if provided).

The representation of the user's hand may be a virtual representation of the user's hand. Alternatively, the detector may be configured to detect pixels corresponding to skin colours around a detected occlusion, and the image renderer may be configured to render parts of the captured image corresponding to the user's hand for display to the HMD wearer.

Figure 17:
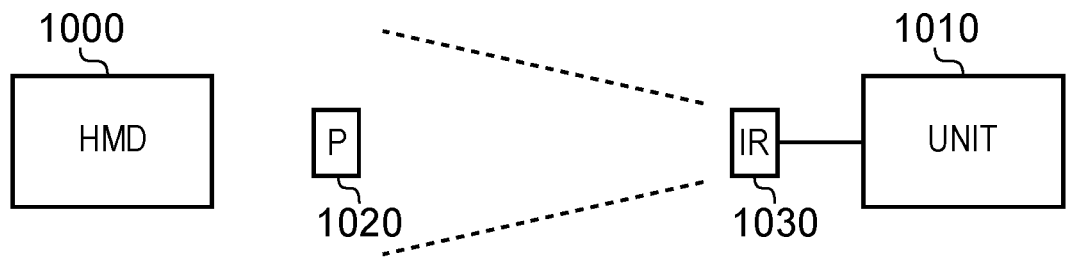
FIG. 17 schematically illustrates an HMD and a base unit.

FIG. 17 schematically illustrates an HMD 1000 (for example the HMD 20 discussed above) and a base unit 1010 (for example the games machine 300 or the breakout box 350 discussed above). A peripheral 1020 such as the peripheral 500 discussed above is shown position in front of the HMC 1000 to illustrate the arrangement by which the HMD user is holding and operating the peripheral 1020. The base unit 1010 comprises an infrared illuminator 1030 such as one or more infrared light emitting diodes (LEDs) generally directed towards the HMD 1000 and the peripheral 1020, so as to provide a back illumination of the peripheral 1020.

Infrared illumination is used in this example for two reasons. The first reason is that it is substantially invisible to the human eye. This is not a consideration relevant to the HMD wearer, because the HMD wearer's eyes are shielded from seeing the ambient surroundings by the HMD itself. Generally speaking, the HMD wearer sees only what is displayed on the display screens of the HMD. However, given that there may be other people in the same environment (for example, the same room) who are not wearing an HMD, the use of infrared illumination can be subjectively less disturbing to those other people. The second reason is that it is possible, by means of optical filters, to arrange separate cameras mounted with respect to the HMD and/or the base unit 1010, to acquire visible light images and infrared-illuminated images. This allows image detail relating to the infrared illumination to be acquired separately from detail relating to visible light images.

However, it will be appreciated that in other embodiments, visible light illumination could be used to provide back illumination of the peripheral 1020.

Figure 18:
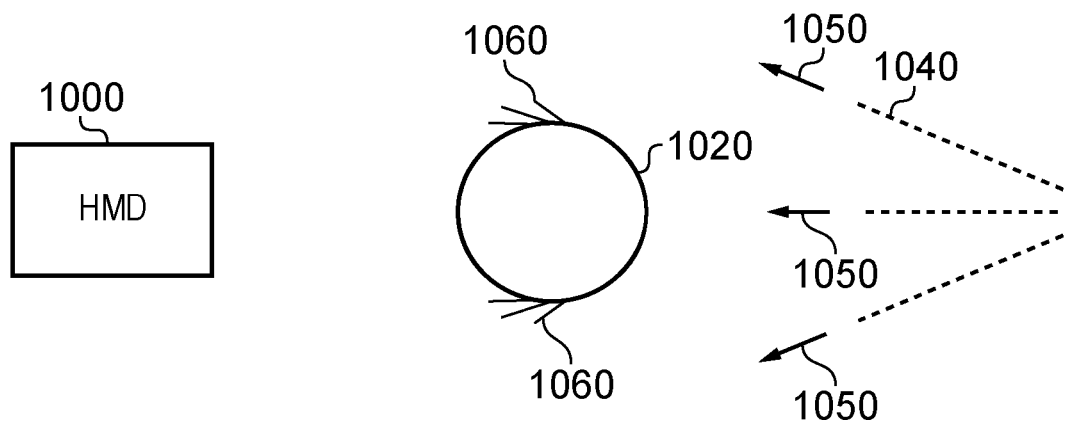
FIG. 18 schematically illustrates the illumination of a peripheral.

FIG. 18 schematically illustrates the illumination of the peripheral 1020. Here, the peripheral 1020 is shown schematically as having a circular cross-section, but it will be understood that this is merely for the purposes of describing an example. Illumination 1040 from the infrared illuminator 1030 (which is not shown in FIG. 18) is illustrated. In this example, it is assumed that the HMD 1000 has one or more forward-facing cameras arrange to acquire images of the space in front of the HMD wearer, including the peripheral 1020 in use by the HMD wearer, for the purposes discussed above in relation to generating a virtual representation of the peripheral.

In the arrangement of FIG. 18, the back illumination 1040 leads to diffraction at the edges of the peripheral 1020 which are disposed laterally with respect to a propagation direction 1050 of the infrared illumination. Clearly, representing optical diffraction in a schematic line drawing of the nature of FIG. 18 has to be done in a highly schematic manner, but for the purposes of this description, the effects of diffraction at the upper and lower edges of the cross-section of the peripheral 1020 (as drawn) are illustrated as patterns 1060. From the point of view of the HMD 1000, on the other side of the peripheral 1020 to the illumination, the effect will be seen as a brighter region or "halo" around the edges of the peripheral 1020. In turn, this allows the camera or cameras associated with the HMD 1000 to detect the edges of the peripheral 1020 and therefore its shape and current configuration relative to the camera.

Note that even in the absence of diffraction at the edges, the back illumination of the peripheral 1020 will provide a clearer demarcation of the edges, because the edges will be indicated (to a camera or cameras associated with the HMD 1000) by a transition between illumination and shadow.

Figure 19:
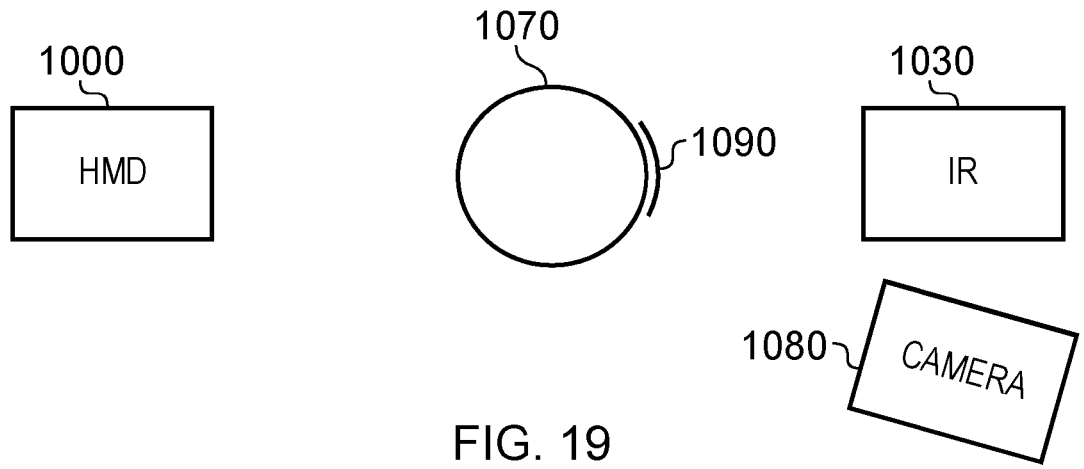
FIG. 19 schematically illustrates a rear marking of a peripheral.

FIG. 19 schematically illustrates a rear marking of a peripheral.

The techniques to be described with reference to FIG. 19 can be used in conjunction with, or instead of, the techniques described with reference to FIGS. 17 and 18. Here, a peripheral 1070 is subject to similar rear illumination from the infrared illuminator 1030 and is also subject to detection by a camera 1080, for example a camera associated with and connected to the base unit 1010. A distinctive marking 1090 is provided on a rear facing surface of the peripheral 1070. The marking 1090 is considered "distinctive" by virtue of the manner in which the camera 1080 and its associated image processing can detect the marking 1090, particularly when the marking 1090 is illuminated by the infrared illumination from the illuminator 1030.

Examples of markings which would be considered distinctive in this manner include retroreflective markings, markings having a colour (such as a bright green or bright pink) which may be unusual in the surroundings of a normal room, and/or markings having a spatial pattern which can be distinguished by the camera 1080 and associated image processing. Examples of such a pattern might be alternate markings spaced around the peripheral 1070 having different respective sizes, for example in a repetitive pattern such as a circular marking, followed by a marking which is longer than its width, followed by a yet-longer marking (o, -, --), with the pattern then repeating.

FIGS. 17-19 provide examples of a computer games system comprising an HMD system according to any one of the preceding claims and one or more other devices selected from the list consisting of a games console and a break-out box.

In embodiments, one or more of the games console and the break-out box comprises a camera configured to detect images of the peripheral and/or control device.

In embodiments one or more of the games console and the break-out box comprises a light source configured to illuminate (for example, with infra-red illumination) at least part of a rear aspect, with reference to the HMD user, of the peripheral and/or control device.

Figure 20:
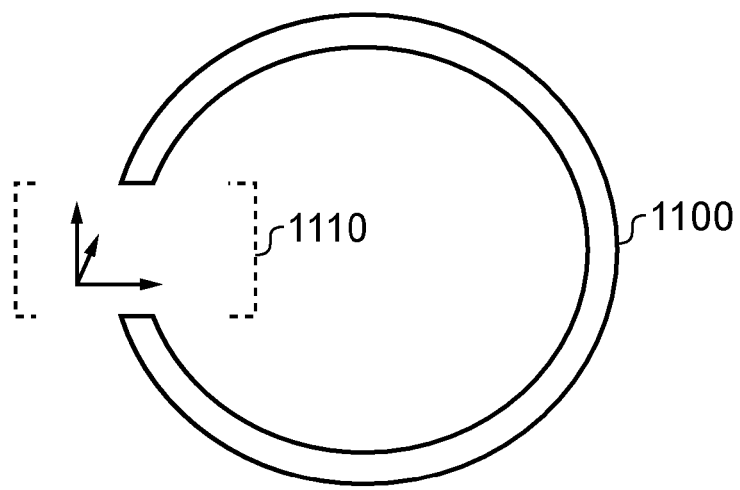
FIGS. 20 and 21 schematically illustrate shape and angle detection.
Figure 21:
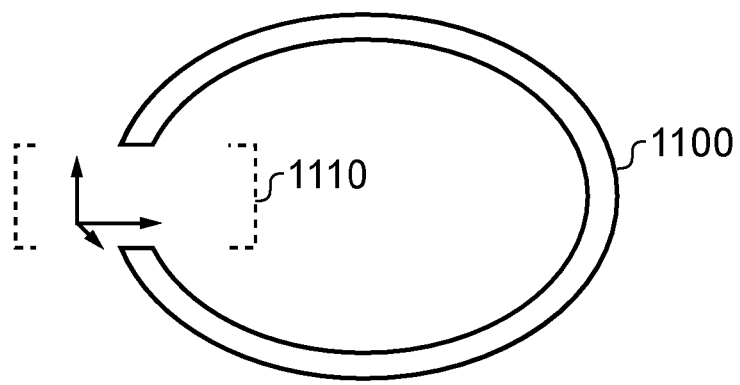

FIGS. 20 and 21 schematically illustrate shape and angle detection. In FIGS. 20 and 21 a circular peripheral such as the steering wheel example discussed above is used for the purposes of this discussion, but it will be appreciated that other shapes and configurations of peripheral are also applicable to these arrangements.

Based on configuration information defining at least the shape of the peripheral, images from the camera or cameras associated with the HMD 1000 and/or the base unit 1010 (or their equivalents in other drawings set out above) can be used to detect the current angular configurations of the peripheral. The configuration information can be set either by the user (or the system, on an automatic basis) specifying a peripheral by its model or other reference data, which is then compared with configuration data held by the system to detect the physical shape (and in some examples size) of the peripheral. Alternatively, or in addition, the user can be prompted during initialisation of an activity using the HMD to hold the peripheral facing the HMD's camera (or a camera associated with the base unit 1010) so that a reference shape and size of the peripheral in a captured images is established.

In the example of FIGS. 20 and 21, the peripheral 1100 is annular in shape. Accordingly, when it is detected in an image (such as an image from the HMD camera) as an annulus, as illustrated schematically in FIG. 20, the can detect that the peripheral is oriented so as to face directly towards the relevant camera. If, however, as shown schematically in FIG. 21, an ellipsoid shape is captured, the system can detect that the peripheral is oriented so as to tilt towards or away from the relevant camera.

FIGS. 20 and 21 also illustrate occlusion regions 1110. For example, these may represent regions at which the user's hand is holding the peripheral. From the analysis discussed above relating to a comparison of a reference shape (and possibly size) with a currently captured shape (and possibly size), the orientation of the peripheral relevant to the occlusion regions 1110 can be detected. From this orientation, detection of skin tones or the like can be used to detect the presence and orientation of the user's hand, and also to provide a more accurate detection of movements such as finger movements of the user's hand.

Figure 22:
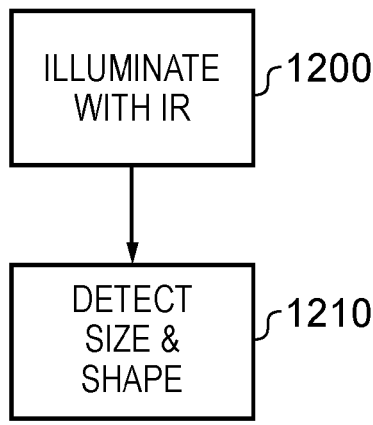
FIG. 22 is a schematic flowchart illustrating aspects of operations of the arrangement of FIG. 17.

FIG. 22 is a schematic flowchart illustrating aspects of operations of the arrangement of FIG. 17. At a step 1200, illumination such as infrared illumination is used to illuminate the peripheral. At a step 1210, the size and/or shape of the peripheral are detected from captured images using the techniques discussed above.

Figure 23:
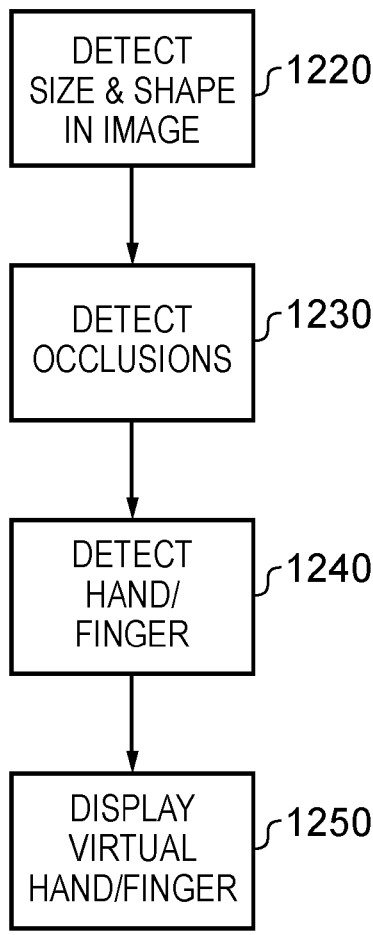
FIG. 23 is a schematic flowchart illustrating aspects of operations of the arrangement of FIG. 17.

FIG. 23 is a schematic flowchart illustrating aspects of operations of the arrangement of FIG. 17. At a step 1220, the size and/or shape of the peripheral is detected from a captured image or more than one captured image. This corresponds generally to the step 1210 in FIG. 22. As discussed above with reference to FIGS. 20 and 21, the orientation of the peripheral is detected from this information. At a step 1230, occlusions in the captured image of the peripheral are detected. At a step 1240, using, for example, skin tone detection, the user's hand and/or fingers are detected in the captured image(s) at the occlusion regions detected at the step 1230. As discussed above, the orientation and/or size of the user's hand can be detected more accurately using the size, shape and orientation detection provided at the step 1220. At a step 1250, a virtual hand and/or finger(s) are displayed at the occlusion regions.

This provides an example of an HMD system in which the detector is configured to detect at least an angular orientation of the peripheral and/or control device from its shape in a captured image; and the image renderer is configured to render the virtual representation in dependence upon the detected angular orientation, and an example of a method of operation of a head mountable display (HMD) comprising: capturing images of a peripheral and/or control device in use by a wearer of the HMD; detecting occlusions in a captured image of the peripheral and/or control device; rendering a virtual version of the peripheral and/or control device for display to the HMD wearer; and rendering a representation of a user's hand at the position of a detected occlusion.

Figure 24A:
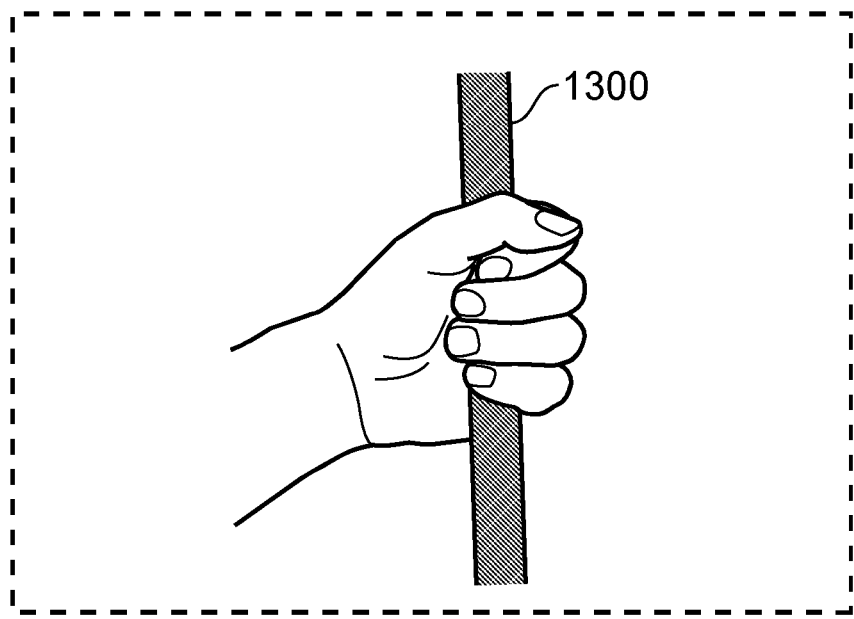
FIGS. 24a and 24b schematically illustrate hand detections.
Figure 24B:
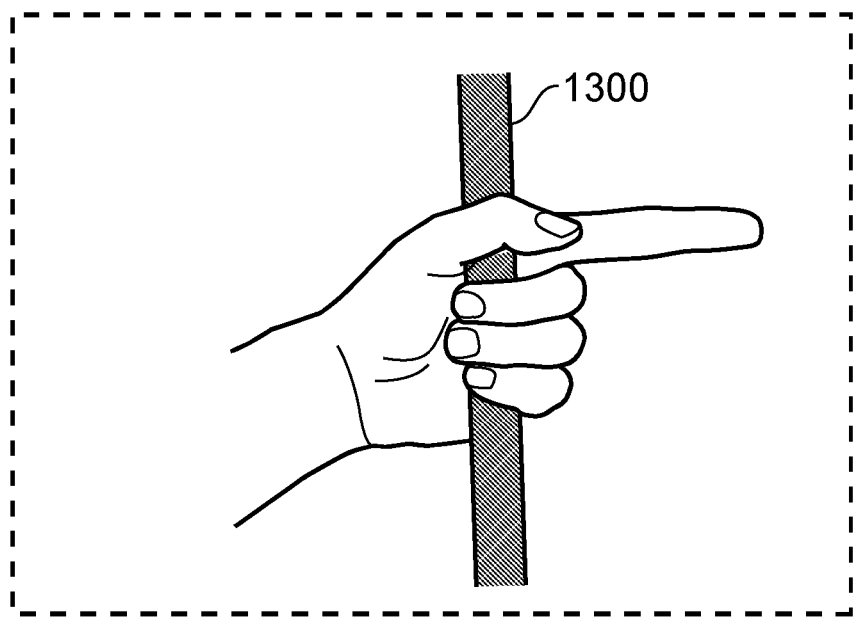

FIGS. 24a and 24b schematically illustrate hand detections. In particular, in FIG. 24a a user's hand is detected holding a portion 1300 of a peripheral (which in this example is shown as being represented by a straight portion 1300). The location of the user's hand is detected from the occlusion detection of the step 1230 discussed above, and from skin tone detection (which, incidentally, allows a generally appropriate skin colour for that operator to be used in the representation of the virtual hand generated at the step 1250). The detection of scale at the step 1220 assists in allowing properly scaled virtual representations of hand or finger movements such as that shown in FIG. 24b to be represented by the displayed virtual hand.

It will be appreciated that the processing discussed above may be carried out by a processor forming part of the HMD, by a games machine, by a break-out box, or by a combination of these.

Accordingly, embodiments of the invention can provide a head mountable display (HMD) comprising a camera operable to capture images of a peripheral and/or control device in use by a wearer of the HMD and to render a virtual version of the peripheral and/or control device for display to the HMD wearer.

In embodiments of the invention, the HMD or an associated processor can detect occlusions in a captured image of the peripheral or control device and render or cause to be rendered a user's hand at the position of the occlusion. Alternatively the HMD or an associated processor can detect occlusions in a captured image of the peripheral or control device, to detect pixels corresponding to skin colours around the occlusion, and to render parts of the image corresponding to the user's hand for display to the HMD wearer.

The selection of which hand can be based at least in part on either or both of user profile data indicating the user's dominant hand, and the position of the occlusion relative to the peripheral or control device.

The HMD could be displaying computer game material, for example. the HMD can be associated with one or more other devices such as a games console and/or a break-out box.

The detection of the device and/or of the occlusion could make use of the detection of markings and/or illumination on the device.

False occlusions could be detected by comparing the occlusion with sensor data relating to the device, or by using another camera, or detecting inconsistencies with control data from one or more other peripherals indicating the user touching the other peripherals.

Another device can use a similar technique to detect the relative position of the HMD. Multiple devices can detect their relative positions. The other devices can be smartphones (including iOS® or Android® smartphones, for example) or controllers such as the Move or Sixaxis controller.

Features such as haptic feedback can be enabled or disabled for a peripheral in dependence upon whether an occlusion is detected.

Embodiments of the invention also provide a system of an HMD, one or more peripheral or control devices, and optionally a base device such as a games console or break-out box.

Accordingly, embodiments of the invention can also provide a method of operation of a head mountable display (HMD) comprising: capturing images of a peripheral and/or control device in use by a wearer of the HMD; and rendering a virtual version of the peripheral and/or control device for display to the HMD wearer.

It will be appreciated that embodiments of the present invention may be implemented in hardware, programmable hardware, software-controlled data processing arrangements or combinations of these. It will also be appreciated that computer software or firmware used in such embodiments, and providing media for providing such software or firmware (such as storage media, for example a machine-readable non-transitory storage medium such as a magnetic or optical disc or a flash memory) are considered to represent embodiments of the present invention.

Obviously, numerous modifications and variations of the present disclosure are possible in light of the above teachings. It is therefore to be understood that within the scope of the appended claims, the invention may be practised otherwise than as specifically described herein.

The invention claimed is:

1. A head mountable display (HMD) system comprising:
a camera configured to capture images of a peripheral and/or control device in use by a wearer of the HMD;
a detector configured to detect an occlusion, by a hand of the wearer in a captured image, of the peripheral and/or control device; and
an image renderer configured to render a virtual version of the peripheral and/or control device for display to the HMD wearer and to render a representation of a user's hand at a position of the detected occlusion in the captured image.

2. An HMD system according to claim 1, in which the representation of the user's hand is a virtual representation of the user's hand.

3. An HMD system according to claim 2, in which:
the detector is configured to detect at least an angular orientation of the peripheral and/or control device from a shape of the peripheral and/or control device in a captured image; and
the image renderer is configured to render the virtual representation in dependence upon the detected angular orientation.

4. An HMD system according to claim 1, in which:
the detector is configured to detect pixels corresponding to skin colours around a detected occlusion, and
the image renderer is configured to render parts of the captured image corresponding to the user's hand for display to the HMD wearer.

5. An HMD system according to claim 2, in which the image renderer is configured to select a hand to be rendered based at least in part on either or both of user profile data indicating the user's dominant hand, and the position of the occlusion relative to the peripheral and/or control device.

6. An HMD system according to claim 1, in which the HMD is configured to display computer game material.

7. An HMD system according to claim 1, in which the detector is configured to detect one or both of markings and illumination on the peripheral and/or control device in the captured images.

8. An HMD system according to claim 1, in which the detector is configured to detect false occlusions by comparing a detected occlusion with sensor data relating to the peripheral and/or control device.

9. An HMD system according to claim 1, in which the detector is configured to detect false occlusions by detecting inconsistencies with control data from one or more other peripheral and/or control devices indicating the user touching the other peripheral and/or control devices.

10. An HMD system according to claim 1, in which the detector is configured to detect false occlusions by detecting images of the peripheral and/or control device captured by another camera.

11. An HMD system according to claim 1, in which the HMD system is configured to enable or disable haptic feedback for a given peripheral and/or control device in dependence upon whether an occlusion of the given peripheral and/or control device is detected.

12. The HMD system according to claim 2, wherein the image renderer is configured to render the virtual representation of the user's hand by deciding which hand should be rendered based upon either or both of (a) an indication of which hand of the user is dominant, and (b) a current direction of movement of the peripheral and/or control device.

13. A computer games system, comprising:
a head mountable display (HMD) system including:
a camera configured to capture images of a peripheral and/or control device in use by a wearer of the HMD;
a detector configured to detect an occlusion, by a hand of the wearer in a captured image, of the peripheral and/or control device; and
an image renderer configured to render a virtual version of the peripheral and/or control device for display to the HMD wearer and to render a representation of a user's hand at a position of the detected occlusion in the captured image; and
one or more other devices selected from the list consisting of: a games console and a break-out box.

14. A computer games system according to claim 13, in which one or more of the games console and the break-out box comprises a camera configured to detect images of the peripheral and/or control device.

15. A computer games system according to claim 13, in which one or more of the games console and the break-out box comprises a light source configured to illuminate at least part of a rear aspect, with reference to a user of the HMD, of the peripheral and/or control device.

16. A computer games system according to claim 15, in which the illuminator is an infra-red illuminator.

17. The computer games system according to claim 13, wherein the image renderer is configured to render the representation of the user's hand by deciding which hand should be rendered based upon either or both of (a) an indication of which hand of the user is dominant, and (b) a current direction of movement of the peripheral and/or control device.

18. A method of operation of a head mountable display (HMD) comprising:
    capturing images of a peripheral and/or control device in use by a wearer of the HMD;
    detecting an occlusion, by a hand of the wearer in a captured image, of the peripheral and/or control device;
    rendering, by one or more processors, a virtual version of the peripheral and/or control device for display to the HMD wearer; and
    rendering, by the one or more processors, a representation of a user's hand at a position of the detected occlusion in the captured image.

19. The method of operation of the HMD according to claim 18, wherein rendering the representation of the user's hand comprises deciding which hand should be rendered based upon either or both of (a) an indication of which hand of the user is dominant, and (b) a current direction of movement of the peripheral and/or control device.

20. A non-transitory computer-readable storage medium which stores computer instructions thereon, the instructions, when executed by one or more processors, causes the one or more processors to perform a method of operation of a head mountable display (HMD) comprising:
    capturing images of a peripheral and/or control device in use by a wearer of the HMD;
    detecting an occlusion, by a hand of the wearer in a captured image, of the peripheral and/or control device;
    rendering, by one or more processors, a virtual version of the peripheral and/or control device for display to the HMD wearer; and
    rendering, by the one or more processors, a representation of a user's hand at a position of the detected occlusion in the captured image.

* * * * *